(12) United States Patent
Kawasue

(10) Patent No.: US 8,553,082 B2
(45) Date of Patent: Oct. 8, 2013

(54) DISTORTION INSPECTING APPARATUS AND DISTORTION INSPECTING METHOD

(75) Inventor: Kikuhito Kawasue, Miyazaki (JP)

(73) Assignee: University of Miyazaki, Miyazaki (JP)

( * ) Notice: Subject to any disclaimer, the term of this patent is extended or adjusted under 35 U.S.C. 154(b) by 980 days.

(21) Appl. No.: 12/602,642

(22) PCT Filed: May 26, 2008

(86) PCT No.: PCT/JP2008/059681
§ 371 (c)(1),
(2), (4) Date: Dec. 1, 2009

(87) PCT Pub. No.: WO2008/149712
PCT Pub. Date: Dec. 11, 2008

(65) Prior Publication Data
US 2010/0182423 A1    Jul. 22, 2010

(30) Foreign Application Priority Data

Jun. 1, 2007    (JP) ................................. 2007-147309

(51) Int. Cl.
*H04N 7/18*    (2006.01)

(52) U.S. Cl.
USPC ........................................... 348/130; 348/86

(58) Field of Classification Search
USPC .......................................... 348/386, 130, 86
See application file for complete search history.

(56) References Cited

U.S. PATENT DOCUMENTS

| | | | | |
|---|---|---|---|---|
| 3,788,750 A | * | 1/1974 | Maltby et al. ............... | 356/239.1 |
| 4,585,343 A | * | 4/1986 | Schave et al. ............... | 356/237.2 |
| 5,309,222 A | * | 5/1994 | Kamei et al. ................. | 356/613 |
| 5,446,536 A | * | 8/1995 | Miyake et al. ............. | 356/239.1 |
| 5,568,258 A | * | 10/1996 | Uemura et al. ............. | 356/237.1 |
| 5,691,811 A | * | 11/1997 | Kihira ........................ | 356/239.1 |
| 5,724,140 A | * | 3/1998 | Haywood ..................... | 356/600 |
| 5,726,749 A | * | 3/1998 | Schave ........................ | 356/239.1 |
| 5,880,843 A | * | 3/1999 | Hermosillo-Valadez et al. ............................. | 356/600 |
| 6,208,412 B1 | * | 3/2001 | Ladewski ................... | 356/239.1 |

(Continued)

FOREIGN PATENT DOCUMENTS

| | | |
|---|---|---|
| JP | 5-312529 A | 11/1993 |
| JP | 6-144006 A | 5/1994 |

(Continued)

OTHER PUBLICATIONS

Patent Abstracts of Japan, Publication No. 11-125507, dated May 11, 1999, 1 page.

(Continued)

*Primary Examiner* — Duyen Doan
(74) *Attorney, Agent, or Firm* — Osha Liang LLP

(57) ABSTRACT

A distortion inspecting apparatus, which inspects perspective distortion of a transparent object, includes a projector that projects a plurality of display points arranged at predetermined intervals, a screen that displays an image projected by the projector thereon and allows the image to pass therethrough, a pedestal that disposes the transparent object at a position where the image passed through the screen, a camera that captures the image that passed through the transparent object, and a control device that stores a reference position coordinate of the image that passed through a reference transparent object, compares the reference position coordinate with an inspection position coordinate of the image that passed through the transparent object as an object to be inspected, and calculates a displacement quantity of the reference position coordinate.

20 Claims, 7 Drawing Sheets

(56) References Cited

U.S. PATENT DOCUMENTS

| | | | | |
|---|---|---|---|---|
| 7,471,383 | B2* | 12/2008 | Ehrick | 356/239.1 |
| 2004/0057046 | A1* | 3/2004 | Abbott et al. | 356/239.1 |
| 2008/0111989 | A1* | 5/2008 | Dufour et al. | 356/124 |
| 2009/0141287 | A1* | 6/2009 | Sato et al. | 356/610 |

FOREIGN PATENT DOCUMENTS

| | | |
|---|---|---|
| JP | 8-304038 A | 11/1996 |
| JP | 10-115514 A | 5/1998 |
| JP | 11-072310 A | 3/1999 |
| JP | 11-125507 A | 5/1999 |
| JP | 11-211425 A | 8/1999 |
| JP | 2005-351760 A | 12/2005 |
| WO | 2004/013572 A1 | 2/2004 |

OTHER PUBLICATIONS

Patent Abstracts of Japan, Publication No. 11-072310, dated Mar. 16, 1999, 1 page.
Patent Abstracts of Japan, Publication No. 10-115514, dated May 6, 1998, 1 page.
Patent Abstracts of Japan, Publication No. 05-312529, dated Nov. 22, 1993, 1 page.
Patent Abstracts of Japan, Publication No. 11-211425, dated Aug. 6, 1999, 1 page.
Patent Abstracts of Japan, Publication No. 08-304038, dated Nov. 22, 1996, 1 page.
Patent Abstracts of Japan, Publication No. 2005-351760, dated Dec. 22, 2005, 1 page.
Patent Abstracts of Japan, Publication No. 06-144006, dated May 24, 1994, 1 page.
International Search Report issued in PCT/JP2008/059681, mailed on Jul. 8, 2008, with translation, 5 pages.
Written Opinion issued in PCT/JP2008/059681, mailed on Jul. 8, 2008, 4 pages.
International Preliminary Report on Patentability issued in PCT/JP2008/059681, mailed on Dec. 26, 2008, 8 pages.
Office Action Issued in Japanese Application No. 2009-517803, Dated Jun. 26, 2012 (5 Pages With Machine Translation).
Quaternary Gong Jin, Outside the 3 Name, PIV Full automatic society of automatic control instrumentation, 2006, Annual industrial Application Sivision Proc., pp. 9-13 (5 Pages).
Miyazaki, Koji et al, "Calibration Technique of Piv for Distorted Image Using LCD", IEEE International Symposium on Industrial Electronics (ISIE 2009) Seoul Olymic Parktel, Seoul, Korea, Jul. 5-8, 2009, pp. 301-306 (6 Pages).
Kawasue, Kikuhito et al., "Calibration-free PIV System Using Magnetic Sensors", WSEAS Transactions on Systems, Issue 12, vol. 5, Dec. 2006, pp. 2737-2743 (7 Pages).
Translation of the International Preliminary Report on Patentability issued in International Application No. PCT/JP2008/059681, mailed Jan. 21, 2010, 6 pages.

\* cited by examiner (a)
Position of reference point (Ideal image)

| Number of reference point | Captured position | |
|---|---|---|
| 1 | $U_1$ | $V_1$ |
| 2 | $U_2$ | $V_2$ |
| 3 | $U_3$ | $V_3$ |
| 4 | $U_4$ | $V_4$ |
| 5 | $U_5$ | $V_5$ |
| 6 | $U_6$ | $V_6$ |
| ⋮ | ⋮ | ⋮ |
| n | $U_n$ | $V_n$ |

(b)
Positions of reference points displaced by inspected object

| Number of reference point | Captured position | |
|---|---|---|
| 1 | $U'_1$ | $V'_1$ |
| 2 | $U'_2$ | $V'_2$ |
| 3 | $U'_3$ | $V'_3$ |
| 4 | $U'_4$ | $V'_4$ |
| 5 | $U'_5$ | $V'_5$ |
| 6 | $U'_6$ | $V'_6$ |
| ⋮ | ⋮ | ⋮ |
| n | $U'_n$ | $V'_n$ |

FIG. 6

How to blink reference point (1 : ON 0 : OFF)

|  | Time T1 | Time T2 | Time T3 | Time T4 |
|---|---|---|---|---|
| Point 1 | 0 | 0 | 0 | 1 |
| Point 2 | 0 | 0 | 1 | 0 |
| Point 3 | 0 | 0 | 1 | 1 |
| Point 4 | 0 | 1 | 0 | 0 |
| Point 5 | 0 | 1 | 0 | 1 |
| : | : | : | : | : |
| Point 14 | 1 | 1 | 1 | 0 |
| Point 15 | 1 | 1 | 1 | 1 |

FIG. 7

Binary-coding 15 points are recognized by four times of blinking
($2^n - 1$ points are recognized by n times of blinking)

(a)

● ON, ○ OFF

|  | First | Second | Third | Fourth |
|---|---|---|---|---|
| Point 0 | ○ | ○ | ○ | ○ |
| Point 1 | ○ | ○ | ○ | ● |
| Point 2 | ○ | ○ | ● | ○ |
| Point 3 | ○ | ○ | ● | ● |
| Point 4 | ○ | ● | ○ | ○ |
| Point 5 | ○ | ● | ○ | ● |
| Point 6 | ○ | ● | ● | ○ |
| Point 7 | ○ | ● | ● | ● |
| Point 8 | ● | ○ | ○ | ○ |
| Point 9 | ● | ○ | ○ | ● |
| Point 10 | ● | ○ | ● | ○ |
| Point 11 | ● | ○ | ● | ● |
| Point 12 | ● | ● | ○ | ○ |
| Point 13 | ● | ● | ○ | ● |
| Point 14 | ● | ● | ● | ○ |
| Point 15 | ● | ● | ● | ● |

(b)

First

| ○ 0 | ○ 1 | ○ 2 | ○ 3 |
|---|---|---|---|
| ○ 4 | ○ 5 | ○ 6 | ○ 7 |
| ● 8 | ● 9 | ● 10 | ● 11 |
| ● 12 | ● 13 | ● 14 | ● 15 |

Second

| ○ 0 | ○ 1 | ○ 2 | ○ 3 |
|---|---|---|---|
| ● 4 | ● 5 | ● 6 | ● 7 |
| ○ 8 | ○ 9 | ○ 10 | ○ 11 |
| ● 12 | ● 13 | ● 14 | ● 15 |

Third

| ○ 0 | ○ 1 | ● 2 | ● 3 |
|---|---|---|---|
| ○ 4 | ○ 5 | ● 6 | ● 7 |
| ○ 8 | ○ 9 | ● 10 | ● 11 |
| ○ 12 | ○ 13 | ● 14 | ● 15 |

Fourth

| ○ 0 | ● 1 | ○ 2 | ● 3 |
|---|---|---|---|
| ○ 4 | ● 5 | ○ 6 | ● 7 |
| ○ 8 | ● 9 | ○ 10 | ● 11 |
| ○ 12 | ● 13 | ○ 14 | ● 15 |

# DISTORTION INSPECTING APPARATUS AND DISTORTION INSPECTING METHOD

TECHNICAL FIELD

This invention relates to a distortion inspecting apparatus and a distortion inspecting method and, more specifically, to a distortion inspecting apparatus, which automatically calculates, by computing an amount of distortion of a transparent object such as a glass or a reflective object such as a mirror, the distortion amount of the object to be inspected.

BACKGROUND ART

As a plate glass used as a window glass of a vehicle, adopted is one which has a complex three-dimensional shape in accordance with the requirements such as the design and the aerodynamic characteristics. When seeing an object through such a window glass constituted of a three-dimensional curved surface, the object may be seen as distorted. This phenomenon is called a perspective distortion phenomenon and it is known that the phenomenon occurs in a non-parallel portion and a curved portion of a plate glass. The perspective distortion is a disincentive for the visibility of a driver especially when driving a vehicle, and therefore, the permissible maximum value of the perspective distortion should be determined. Currently, although whether or not the perspective distortion falls within the permissible maximum value is inspected before product shipment, the perspective distortion of a glass is visually inspected by an inspector. Therefore, there are problems that the visual inspection varies between individuals, and the productivity cannot be enhanced due to inspection inefficiency.

As the prior art, in Patent Document 1, disclosed is a method in which the perspective distortion of an object to be inspected is inspected by capturing an LED plate which is disposed in front of the object to be inspected and constituted of a plurality of segments forming a predetermined angle, by a camera which is disposed behind the object to be inspected, through the object to be inspected. In this method, a reference length of each segment was measured in such a state that the object to be inspected was removed, and the reference length and a length with distortion which is measured through the object to be inspected are compared with each other.

Patent Document 1: Japanese Patent Application Laid-Open No. 6-144006

DISCLOSURE OF THE INVENTION

However, in the prior art disclosed in the Patent Document 1, since the LEDs are arranged in a segment pattern and thus the object to be inspected and the camera should be moved in order to inspect the entire surface of the object to be inspected, there are problems that the inspection requires considerable time and it is difficult to specify the distortion position. Further, since calculation is performed in the inspection of distortion so that the lengths of the segments are compared, there is a problem that the calculation requires time.

One or more embodiments of the present invention provide a distortion inspecting apparatus that can accurately inspect the distortion of the transparent object with a simple constitution by projecting an image on a screen by a display device which electrically displays dots, previously storing a reference position coordinate of an image having passed through a reference transparent object, comparing the reference position coordinate and an inspection position coordinate of the image having passed through the transparent object as an object to be inspected, and calculating a displacement quantity of the reference position coordinate.

One or more embodiments of the present invention can also improve the detection accuracy of the object to be inspected by electrically displaying the dots and suitably changing the position and density of the dots according to an amount of distortion.

One or more embodiments of the present invention can also create a correspondence table between the reference position coordinate and the inspection position coordinate quickly and accurately by electrically displaying the dots.

SUMMARY OF THE INVENTION

A first aspect of the present invention provides a distortion inspecting apparatus for inspecting perspective distortion of a transparent object that includes a projector that projects a plurality of display points arranged at predetermined intervals, a screen that displays an image projected by the projector thereon and allows the image to pass therethrough, a pedestal that disposes the transparent object at a position where the image passed through the screen, a camera that captures the image that passed through the transparent object, and a control device that stores a reference position coordinate of the image that passed through a reference transparent object, compares the reference position coordinate with an inspection position coordinate of the image that passed through the transparent object as an object to be inspected, and calculates a displacement quantity of the reference position coordinate.

According to the first aspect of the present invention, a plurality of display points arranged at predetermined intervals is projected on a screen by the projection means such as a projector. A transparent object to be inspected, such as a glass, is disposed in front of the screen. Further, an image having passed through the transparent object is captured by a camera. The image data is sent to the control means. The control means previously stores a reference position coordinate of an image having passed through a reference transparent object, compares the reference position coordinate with the inspection position coordinate of the image having passed through the transparent object as an object to be inspected, and calculates the displacement quantity of the reference position coordinate. According to this constitution, the object to be inspected can be accurately and automatically inspected by accepting the inspected object with the displacement quantity smaller than a criterion value.

According to a second aspect, this invention provides a distortion inspecting apparatus for inspecting the perspective distortion of a transparent object that includes a projector that projects a plurality of display points arranged at predetermined intervals, a pedestal that disposes the transparent object at a position where an image projected by the projector passes through, a screen that displays the image that passed through the transparent object, a camera that captures the image displayed on the screen, and a control device that stores a reference position coordinate of the image that passed through a reference transparent object, compares the reference position coordinate with the inspection position coordinate of the image that passed through the transparent object as an object to be inspected, and calculates the displacement quantity of the reference position coordinate.

According to the second aspect of the present invention, a plurality of display points arranged at predetermined intervals are projected on a screen after passing through a transparent object to be inspected by the projection means such as projector. Further, an image on the screen is captured by a camera. The image data is sent to the control means. The control means previously stores a reference position coordinate of an image having passed through a reference transparent object, compares the reference position coordinate with the inspection position coordinate of the image having passed through the transparent object as an object to be inspected, and calculates the displacement quantity of the reference position coordinate. According to this constitution, the object to be inspected can be accurately and automatically inspected by accepting the inspected object with the displacement quantity smaller than a criterion value.

According to a third aspect, this invention provides a distortion inspecting apparatus for inspecting reflective distortion of a reflective object that includes a projector that projects a plurality of display points arranged at predetermined intervals, a pedestal that disposes the reflective object at a position where an image projected by the projector is reflected, a screen that displays the image reflected by the reflective object, a camera that captures the image displayed on the screen, and a control device that stores a reference position coordinate of the image reflected by a reference reflective object, compares the reference position coordinate with the inspection position coordinate of the image reflected by the reflective object as an object to be inspected, and calculates the displacement quantity of the reference position coordinate.

According to the third aspect of the present invention, a plurality of display points arranged at predetermined intervals is, by the projection means such as a projector, projected on a screen after being reflected by a reflective object. Further, an image on the screen is captured by a camera. The image data is sent to the control means. The control means previously stores a reference position coordinate of an image reflected by a reference reflective object, compares the reference position coordinate with the inspection position coordinate of the image reflected by the reflective object as an object to be inspected, and calculates the displacement quantity of the reference position coordinate. According to this constitution, the object to be inspected can be accurately and automatically inspected by accepting the inspected object with the displacement quantity smaller than a criterion value.

According to a fourth aspect, this invention provides a distortion inspecting apparatus for inspecting the reflective distortion of a reflective object that includes a screen that displays a plurality of display points arranged at predetermined intervals, a pedestal that disposes the reflective object at a position where an image displayed by the screen is reflected, a camera that captures the image reflected by the reflective object, and a control device that stores the reference position coordinate of the image reflected by a reference reflective object, compares the reference position coordinate with the inspection position coordinate of the image reflected by the reflective object as an object to be inspected, and calculates the displacement quantity of the reference position coordinate.

According to the fourth aspect of the present invention, an image on a display device (such as a liquid crystal panel) which has a plurality of display points arranged at predetermined intervals is reflected by a reflective object, and the reflected image is captured by a camera. The image data is sent to the control means. The control means previously stores a reference position coordinate of an image reflected by a reference reflective object, compares the reference position coordinate with the inspection position coordinate of the image reflected by the reflective object as an object to be inspected, and calculates the displacement quantity of the reference position coordinate. According to this constitution, the object to be inspected can be accurately and automatically inspected by accepting the inspected object with the displacement quantity smaller than a criterion value.

According to a fifth aspect of the present invention, when distortion inspection is performed so that the transparent object or the reflective object is disposed on the pedestal, the control device sequentially displays the display points to capture the display points with the camera, and calculates the displacement quantity of the reference position coordinate based on a positional relationship between the reference position coordinate and the inspection position coordinate.

For performing the distortion inspection, it is needed that the coordinate of the display point is previously examined at a time when a reference transparent object or reflective object is accurately disposed on the disposing means. Thus, according to the fifth aspect of the invention, the display points are displayed one by one and captured, and the reference position coordinate for each reference point is generated and stored. Then, a transparent object or reflective object to be inspected is accurately disposed on the disposing means, and the inspection position coordinate for each reference point is generated and stored. The displacement quantity of the reference point is calculated from the difference between each reference position coordinate and the inspection position coordinate. According to this constitution, the displacement quantity of each reference point can be easily calculated.

According to a sixth aspect of the present invention, when the distortion inspection is performed so that the transparent object or the reflective object is disposed on the pedestal, the control device displays the display points in a coded manner to capture the display points with the camera, and calculates the displacement quantity of the reference position coordinate based on a positional relationship between the reference position coordinate and the inspection position coordinate.

In a case where the number of the display points displayed by the display device is small, although the display points may be displayed one by one to generate the reference position coordinate and the inspection position coordinate, its operation becomes more complex according to increase of the number of the display points. Further, since the accuracy of the displacement quantity becomes higher along with the number of the display points, the number of the display points is preferably increased as many as possible. Thus, according to the sixth aspect of the present invention, the display points are displayed in a coded manner to be captured by the imaging means, and the displacement quantity of the reference position coordinate is calculated based on the positional relationship between the reference position coordinate and the inspection position coordinate. According to this constitution, the $2^n-1$ display points can be distinguished by n times of displaying. For example, when n=20, that is, when the display points are displayed 20 times, about million points can be displayed.

According to a seventh aspect of the present invention, when the distortion inspection is performed so that the transparent object or the reflective object is disposed on the pedestal, the control device displays all the display points at once to capture the display points with the camera, and calculates the displacement quantity of the reference position coordinate based on a positional relationship between the reference position coordinate and the inspection position coordinate.

For performing the distortion inspection, it is needed that the coordinate of the display point is previously examined at a time when a reference transparent object or reflective object is accurately disposed on the disposing means. Thus, according to the seventh aspect of the present invention, all the display points are displayed at once and captured, and the reference position coordinate for each reference point is generated and stored. Then, a transparent object or a reflective object to be inspected is accurately disposed on the disposing means, and the inspection position coordinate for each reference point is generated and stored. The displacement quantity of the reference point is calculated from the difference between each reference position coordinate and the inspection position coordinate. According to this constitution, capturing is needed only once.

According to an eighth aspect of the present invention, the projector includes a liquid crystal panel having the plurality of display points, a light source for emitting light from the back side of the liquid crystal panel, and an optical system having a lens.

The projection means includes a liquid crystal panel and light is emitted from its back side to project the display points with being enlarged by a lens. The display points displayed on the liquid crystal panel can be made arbitrarily ON/OFF by external control means. According to this constitution, since the display points can be displayed with being enlarged, the difference of the displacement quantity can be made large.

According to a ninth aspect of the present invention, the screen is constituted of a liquid crystal panel having back side light emitting diodes.

A liquid crystal panel cannot emit light by itself. Thus, the liquid crystal panel generally includes a reflecting plate provided on its back side to reflect outside light for displaying. However, since outside light is not always present, light emitting means is provided on its back side for displaying. According to this constitution, the display resolution is increased and then the density of the display points can be increased without requiring outside light.

According to a tenth aspect of the present invention, the screen is constituted of light emitting diodes arranged at the predetermined intervals.

Although light emitting diodes cannot increase the display density as much as a liquid crystal panel, they can constitute a display device with a considerably high density by being arranged in a matrix form. However, the biggest feature of the light emitting diode is to emit light by itself. According to this constitution, a display device with high brightness can be realized without requiring outside light and back side light emitting means.

According to an eleventh aspect, this invention provides a distortion inspecting method of inspecting the perspective distortion of a transparent object that includes projecting a plurality of display points arranged at predetermined intervals, displaying an image projected by the plurality of display points and allowing the image to pass therethrough, disposing the transparent object at a position where the image has passed through, capturing the image that passed through the transparent object, and storing the reference position coordinate of the image that passed through a reference transparent object, comparing the reference position coordinate with the inspection position coordinate of the image that passed through the transparent object as an object to be inspected, and calculating the displacement quantity of the reference position coordinate.

According to a twelfth aspect, this invention provides a distortion inspecting method of inspecting the perspective distortion of a transparent object that includes projecting a plurality of display points arranged at predetermined intervals, disposing the transparent object at a position where an image projected by the plurality of display points passes through, displaying the image that passed through the transparent object, capturing the image displayed by the displaying, and storing the reference position coordinate of the image that passed through a reference transparent object, comparing the reference position coordinate with the inspection position coordinate of the image that passed through the transparent object as an object to be inspected, and calculating the displacement quantity of the reference position coordinate.

According to a thirteenth aspect, this invention provides a distortion inspecting method of inspecting the reflective distortion of a reflective object that includes projecting a plurality of display points arranged at predetermined intervals, disposing the reflective object at a position where an image projected by the plurality of display points is reflected, displaying the image reflected by the reflective object, capturing the image displayed by the displaying, and storing the reference position coordinate of the image reflected by a reference reflective object, comparing the reference position coordinate with the inspection position coordinate of the image reflected by the reflective object as an object to be inspected, and calculating the displacement quantity of the reference position coordinate.

According to a fourteenth aspect, this invention provides a distortion inspecting method of inspecting the reflective distortion of a reflective object that includes displaying a plurality of display points arranged at predetermined intervals, disposing the reflective object at a position where an image displayed by the displaying is reflected, capturing the image reflected by the reflective object, and storing the reference position coordinate of the image reflected by a reference reflective object, comparing the reference position coordinate with the inspection position coordinate of the image reflected by the reflective object as an object to be inspected, and calculating the displacement quantity of the reference position coordinate.

According to a fifteenth aspect of the present invention, when the distortion inspection is performed so that the transparent object or the reflective object is disposed by the disposing, the method further includes sequentially displaying the display points to capture the display points, and calculating the displacement quantity of the reference position coordinate based on a positional relationship between the reference position coordinate and the inspection position coordinate.

According to a sixteenth aspect of the present invention, when the distortion inspection is performed so that the transparent object or the reflective object is disposed by the disposing, the method further includes displaying the display points in a coded manner to capture the display points, and calculating the displacement quantity of the reference position coordinate based on a positional relationship between the reference position coordinate and the inspection position coordinate.

According to a seventeenth aspect of the present invention, when the distortion inspection is performed so that the transparent object or the reflective object is disposed by the disposing, the method further includes displaying all the display points at once to capture the display points, and calculating the displacement quantity of the reference position coordinate based on a positional relationship between the reference position coordinate and the inspection position coordinate.

According to one or more embodiments of the invention, the reference position coordinate of the image having passed through the reference transparent object is previously stored. The reference position coordinate and the inspection position coordinate of the image having passed through the transparent object as an object to be inspected are compared with each other, and the displacement quantity of the reference position coordinate is calculated. Therefore, the object to be inspected can be accurately and automatically inspected by accepting the inspected object with the displacement quantity smaller than a criterion value.

In addition, since the display points are displayed one by one and captured and the reference position coordinate for each reference point and the inspection position coordinate are generated, the displacement quantity of each reference point can be easily calculated.

In addition, since the display points are displayed in a coded manner to be captured by the imaging means and the displacement quantity of the reference point is calculated based on the positional relationship between the reference position coordinate and the inspection position coordinate, $2^n - 1$ display points can be distinguished by displaying n times.

In addition, since the projection means includes the liquid crystal panel to emit light from its back side for projecting with enlargement by a lens and the display points displayed on the liquid crystal panel can be made arbitrarily ON/OFF by external control means and displayed with being enlarged, the difference of the displacement quantity can be made large.

In addition, since the liquid crystal panel includes the light emitting means provided on its back side for displaying, the display resolution is increased and the density of the display points can be increased without requiring outside light.

In addition, since a light emitting diode is used in a display device, the display device with high brightness can be realized without requiring outside light and back side light emitting means.

BRIEF DESCRIPTION OF DRAWINGS

FIG. 6 is a diagram explaining a method of discriminating each point by displaying a large number of points concurrently with sequentially blinking to code them and capturing the blinking state by a CCD camera.

FIGS. 7(*a*) and 7(*b*) show diagrams for explaining a case where 15 points are recognized by four times of blinking with binary-coding according to one or more embodiments of the present invention.

DESCRIPTION OF REFERENCE NUMERALS

Figure 1:
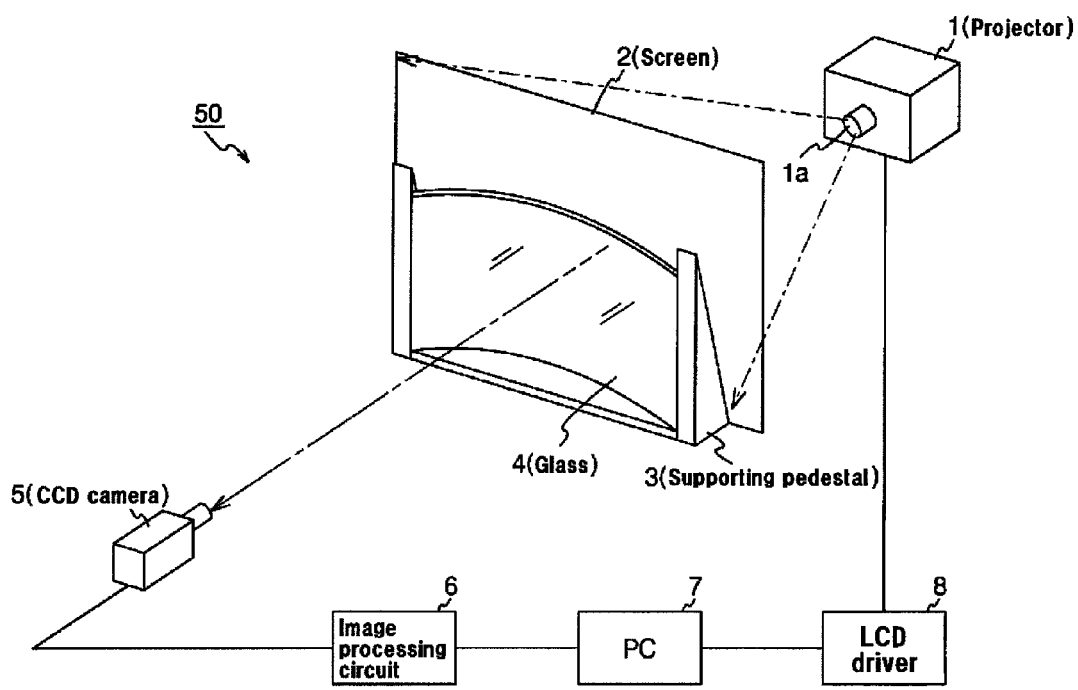
FIG. 1 is a view showing a schematic constitution of a distortion inspecting apparatus according to a first embodiment of this invention.

1 Projector
2 Screen
3, 10 Supporting pedestal
4 Glass
5 CCD camera
6 Image processing circuit
7 PC
8 LCD driver
9 Mirror
11 Liquid crystal panel
50, 51, 52, 53 Distortion inspecting apparatus

DETAILED DESCRIPTION

Hereinafter, the present invention will be described in detail by using embodiments shown in the drawings. Note that the scope of the invention is not limited to the components, kinds, combinations, shapes, relative arrangements and so on described in the embodiments unless they are accompanied with descriptions to specify them, but they are only examples.

FIG. 1 is a view showing a schematic constitution of a distortion inspecting apparatus according to a first embodiment of this invention. The distortion inspecting apparatus 50 inspects the perspective distortion of a glass (transparent object) 4 and is provided with a projector (projection means) 1 which projects a plurality of display points arranged at predetermined intervals, a screen (display means) 2 which displays an image projected by the projector 1 thereon and allows the image to pass therethrough, a supporting pedestal (disposing means) 3 which disposes the glass 4 at a position where the image having passed through the screen 2 passes through, a CCD camera (imaging means) 5 which captures the image having passed through the glass 4, an image processing circuit 6 which processes image data captured by the CCD camera 5 into a format so that a computer easily processes the image data, a PC (control means) 7 which receives the image data processed by the image processing circuit 6 and calculates a displacement quantity, and an LCD driver 8 which drives a liquid crystal panel of the projector 1.

The PC 7 previously stores a reference position coordinate of an image having passed through a reference glass, compares the reference position coordinate with an inspection position coordinate of the image having passed through the glass 4 as an object to be inspected, and calculates the displacement quantity of the reference position coordinate (to be described later in detail).

Namely, in the present embodiment, the plurality of display points arranged at the predetermined intervals is projected on the screen 2 by the projector 1. The glass 4 is disposed in front of the screen 2 as the object to be inspected. Further, the image having passed through the glass 4 is captured by the CCD camera 5. The image data is sent to the PC 7 via the image processing circuit 6. The PC 7 previously stores the reference position coordinate of the image having passed through the reference glass, compares the reference position coordinate with the inspection position coordinate of the image having passed through the glass 4 as the object to be inspected, and calculates the displacement quantity of the reference position coordinate. According to this constitution, the glass 4 can be accurately and automatically inspected by accepting a glass with the displacement quantity smaller than a criterion value, for example. Although the projection image passes through from the back side of the screen 2 in the present embodiment, it may be projected from the diagonally front of the screen 2.

Figure 2:
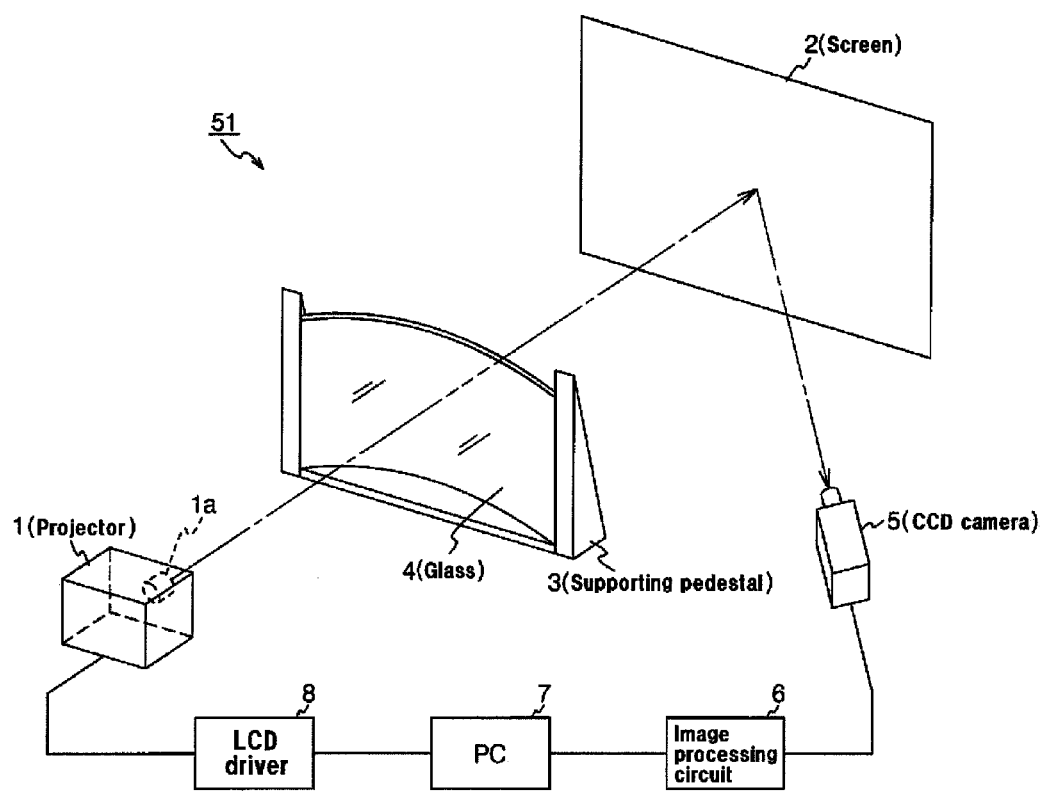
FIG. 2 is a view showing a schematic constitution of a distortion inspecting apparatus according to a second embodiment of this invention.

FIG. 2 is a view showing a schematic constitution of a distortion inspecting apparatus according to a second embodiment of this invention. The same components as those of FIG. 1 will be described with being denoted by the identical reference numerals. The distortion inspecting apparatus 51 inspects the perspective distortion of a glass 4 and is provided with a projector 1 which projects a plurality of display points arranged at predetermined intervals, a supporting pedestal 3 for disposing the glass 4 at a position where an image projected by the projector 1 passes through, a screen 2 for displaying the image having passed through the glass 4, a CCD camera 5 which captures the image displayed on the screen 2, an image processing circuit 6 which processes image data captured by the CCD camera 5 into a format such that a computer easily processes the image data, a PC (control means) 7 which receives the image data processed by the image processing circuit 6 and calculates a displacement quantity, and an LCD driver 8 which drives a liquid crystal panel of the projector 1.

The PC 7 previously stores the reference position coordinate of the image having passed through a reference glass, compares the reference position coordinate with an inspection position coordinate of the image having passed through the glass 4 as an object to be inspected, and calculates the displacement quantity of the reference position coordinate (to be described later in detail).

Namely, in the present embodiment, the plurality of display points arranged at the predetermined intervals having passed through the glass 4 are projected on the screen 2 by the projector 1. Further, the image on the screen 2 is captured by the CCD camera 5. The image data is sent to the PC 7 via the image processing circuit 6. The PC 7 previously stores the reference position coordinate of the image having passed through the reference glass, compares the reference position coordinate with the inspection position coordinate of the image having passed through the glass 4 as the object to be inspected, and calculates the displacement quantity of the reference position coordinate. According to this constitution, the glass 4 can be accurately and automatically inspected by accepting a glass with the displacement quantity smaller than a criterion value, for example.

Figure 3:
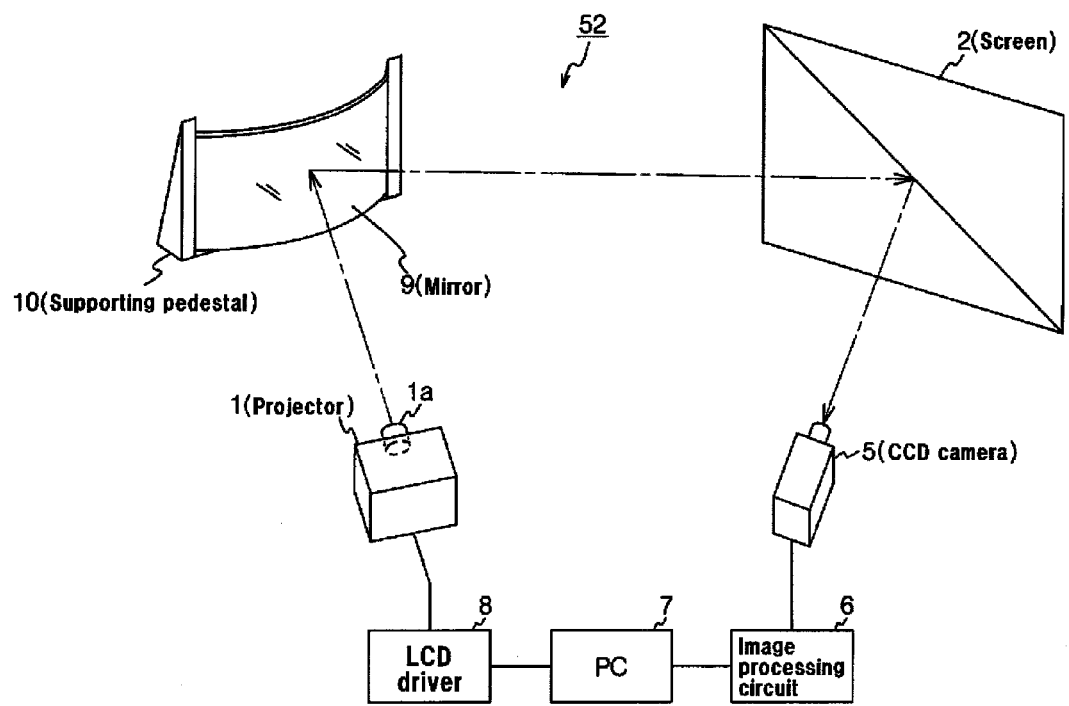
FIG. 3 is a view showing a schematic constitution of a distortion inspecting apparatus according to a third embodiment of this invention.

FIG. 3 is a view showing a schematic constitution of a distortion inspecting apparatus according to a third embodiment of this invention. The same components as those of FIG. 1 will be described with being denoted by the identical reference numerals. The distortion inspecting apparatus 52 inspects the reflective distortion of a mirror (a reflective object) 9 and is provided with a projector 1 which projects a plurality of display points arranged at predetermined intervals, a supporting pedestal (disposing means) 10 for disposing the mirror 9 at a position where an image projected by the projector 1 is reflected, a screen 2 which displays the image reflected by the mirror 9, a CCD camera 5 which captures the image displayed on the screen 2, an image processing circuit 6 which processes image data captured by the CCD camera 5 into a format such that a computer easily processes the image data, a PC 7 which receives the image data processed by the image processing circuit 6 and calculates a displacement quantity, and an LCD driver 8 which drives a liquid crystal panel of the projector 1.

Namely, in the present embodiment, the plurality of display points arranged at predetermined intervals is projected on the screen 2 by the projector 1 after being reflected by the mirror 9. Further, the image on the screen 2 is captured by the CCD camera 5. The image data is sent to the PC 7 via the image processing circuit 6. The PC 7 previously stores a reference position coordinate of an image reflected by a reference mirror, compares the reference position coordinate with an inspection position coordinate of the image reflected by the mirror 9 as an object to be inspected, and calculates the displacement quantity of the reference position coordinate. According to this constitution, the mirror 9 can be accurately and automatically inspected by accepting a mirror with the displacement quantity smaller than a criterion value, for example.

Figures 4, 5:
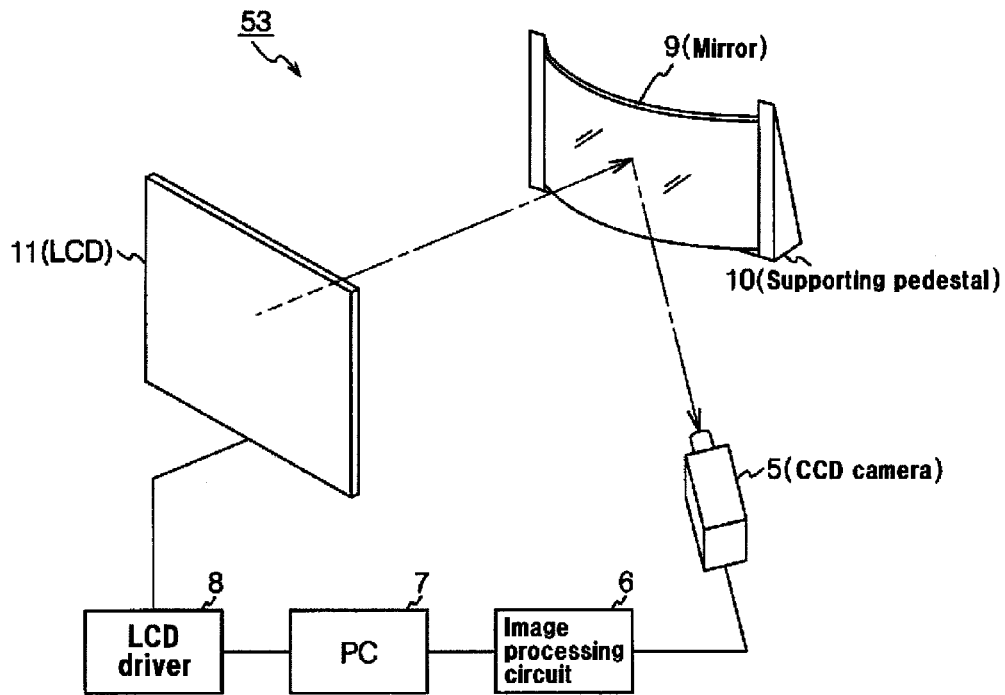
FIG. 4 is a view showing a schematic constitution of a distortion inspecting apparatus according to a fourth embodiment of this invention.
FIG. 5(*a*) is a view showing ideal reference coordinates of reference points and FIG. 5(*b*) is a view showing inspection coordinates to which the reference points are displaced.

FIG. 4 is a view showing a schematic constitution of a distortion inspecting apparatus according to a fourth embodiment of this invention. The same components as those of FIGS. 1 and 3 will be described with being denoted by the identical reference numerals. The distortion inspecting apparatus 53 inspects the reflective distortion of a mirror 9 and is provided with a liquid crystal panel (display means) 11 which displays a plurality of display points arranged at predetermined intervals, a supporting pedestal 10 which disposes the mirror 9 at a position where an image displayed by the liquid crystal panel 11 is reflected by the mirror 9, a CCD camera 5 which captures the image reflected by the mirror 9, an image processing circuit 6 which processes image data captured by the CCD camera 5 into a format such that a computer easily processes the image data, a PC 7 which receives the image data processed by the image processing circuit 6 and calculates a displacement quantity, and an LCD driver 8 which drives the liquid crystal panel 11.

Namely, in the present embodiment, the image on the liquid crystal panel 11 having the plurality of display points arranged at the predetermined intervals is reflected by the mirror 9, and the reflected image is captured by the CCD camera 5. The image data is sent to the PC 7 via the image processing circuit 6. The PC 7 previously stores a reference position coordinate of an image reflected by a reference mirror, compares the reference position coordinate with an inspection position coordinate of the image reflected by the mirror 9 as an object to be inspected, and calculates the displacement quantity of the reference position coordinate. According to this constitution, the mirror 9 can be accurately and automatically inspected by accepting a mirror with the displacement quantity smaller than a criterion value, for example.

FIG. 5($a$) is a diagram showing ideal reference coordinates of the reference points. FIG. 5($b$) is a diagram showing inspection coordinates to which the reference points are displaced. The inspecting method according to one or more embodiments of this invention will be described with reference to FIG. 1. In step S1, the glass 4 is removed, or a glass (ideal glass) with no distortion or a glass (reference glass) with the distortion amount within a standard value is disposed. The image projected on the screen 2 is captured by the CCD camera 5, and each coordinate of the reference points appearing on a CCD screen is detected to generate FIG. 5($a$). In this case, in order to perform precise and high accuracy inspection, as many reference points as possible are detected to be numbered (labeled) (to be described later in detail).

Next, in step S2, the glass 4 to be an inspected object is disposed between the screen 2 and the CCD camera 5, and a dot pattern is displayed on the screen 2. Similarly to step S1, each point is blinked in a coded manner and the number and position of each reference point are detected to generate FIG. 5($b$). In a case where the glass is distorted, although the position of the reference point is displaced, each of the reference points is accurately numbered by a coding method.

Next, in step S3, FIGS. 5($a$) and ($b$) are compared with each other, and the displacement quantity of each reference point is calculated. The displacement quantity of a reference point Pi can be calculated by $$\Delta Pi = [(Ui' - Ui)^2 + (Vi' - Vi)^2]^{1/2} \quad (1)$$

Namely, for performing the inspection of distortion, the coordinates of the display points is previously examined at a time when the glass 4 or mirror 9 to be a reference basis is accurately disposed on the supporting pedestal. Thus, in the present embodiment, the display points are displayed one by one to be captured, and the reference position coordinate for each reference point is generated and previously stored. Next, the glass 4 or the mirror 9 to be the inspected object is accurately disposed on the supporting pedestal, and the inspection position coordinate for each reference point is generated and stored. The displacement quantity of the reference point is calculated from the difference between each reference position coordinate and the inspection position coordinate. According to this constitution, the displacement quantity of each reference point can be easily calculated.

All the display points may be displayed at once and captured. According to this, capturing is needed only once.

FIG. 6 is a diagram explaining a method of discriminating each point by displaying a large number of points concurrently with sequentially blinking to code them and capturing the blinking state by the CCD camera. For example, the reference points are blinked four times from time T1 to time T4 in accordance with FIG. 6, and 15 reference points can be distinguished by capturing an image at each blinking. Thus, $2^n-1$ reference points can be distinguished by blinking n times. Namely, at the time T1, points 1 to 15 blink so that "00000 . . . 11". At the time T2, the points 1 to 15 blink so that "00011 . . . 11". At the time T3, the points 1 to 15 blink so that "01100 . . . 11". At the time T4, the points 1 to 15 blink so that "10101 . . . 01". In that case, 1 is regarded as blinking-on (displayed), and 0 is regarded as blinking-off (not displayed).

FIG. 7 shows diagrams for explaining a case where 15 points are recognized by four times of blinking with binary-coding. In FIG. 7(*a*), in the first time, points 0 to 7 are blinked on, and points 8 to 15 are blinked off. In the second time, the points 0 to 3 are blinked on, the points 4 to 7 are blinked off, the points 8 to 11 are blinked on, and the points 12 to 15 are blinked off. In the third time, the points 0 to 1 are blinked on, the points 2 to 3 are blinked off, the points 4 to 5 are blinked on, the points 6 to 7 are blinked off, the points 8 to 9 are blinked on, the points 10 to 11 are blinked off, the points 12 to 13 are blinked on, and the points 14 to 15 are blinked off. In the fourth time, the points 0, 2, 4, 6, 8, 10, 12, and 14 are blinked on, and the points 1, 3, 5, 7, 9, 11, 13, and 15 are blinked off. FIG. 7(*b*) shows the above results by each blinking time. The 15 points can be recognized by the four times of blinking. Namely, $2^n-1$ display points can be distinguished by n times of displaying. Since the point 0 cannot be displayed with being always blinked off, the number of the display points is $2^n-1$.

Namely, in a case where the number of the display points displayed by the projector 1 is small, although the display points may be displayed one by one to generate the reference position coordinate and the inspection position coordinate, its operation becomes more complex according to increase of the number of the display points. Further, since the accuracy of the displacement quantity becomes higher along with the number of the display points, the number of the display points is preferably increased as many as possible. Thus, in the present embodiment, the display points are displayed in the coded manner to be captured by the CCD camera 5, and the displacement quantity of the reference position coordinate is calculated based on the positional relationship between the reference position coordinate and the inspection position coordinate. According to this constitution, the $2^n-1$ display points can be distinguished by n times of displaying. For example, when n=20, that is, when the display points are displayed 20 times, about million points can be displayed.

Figure 8:
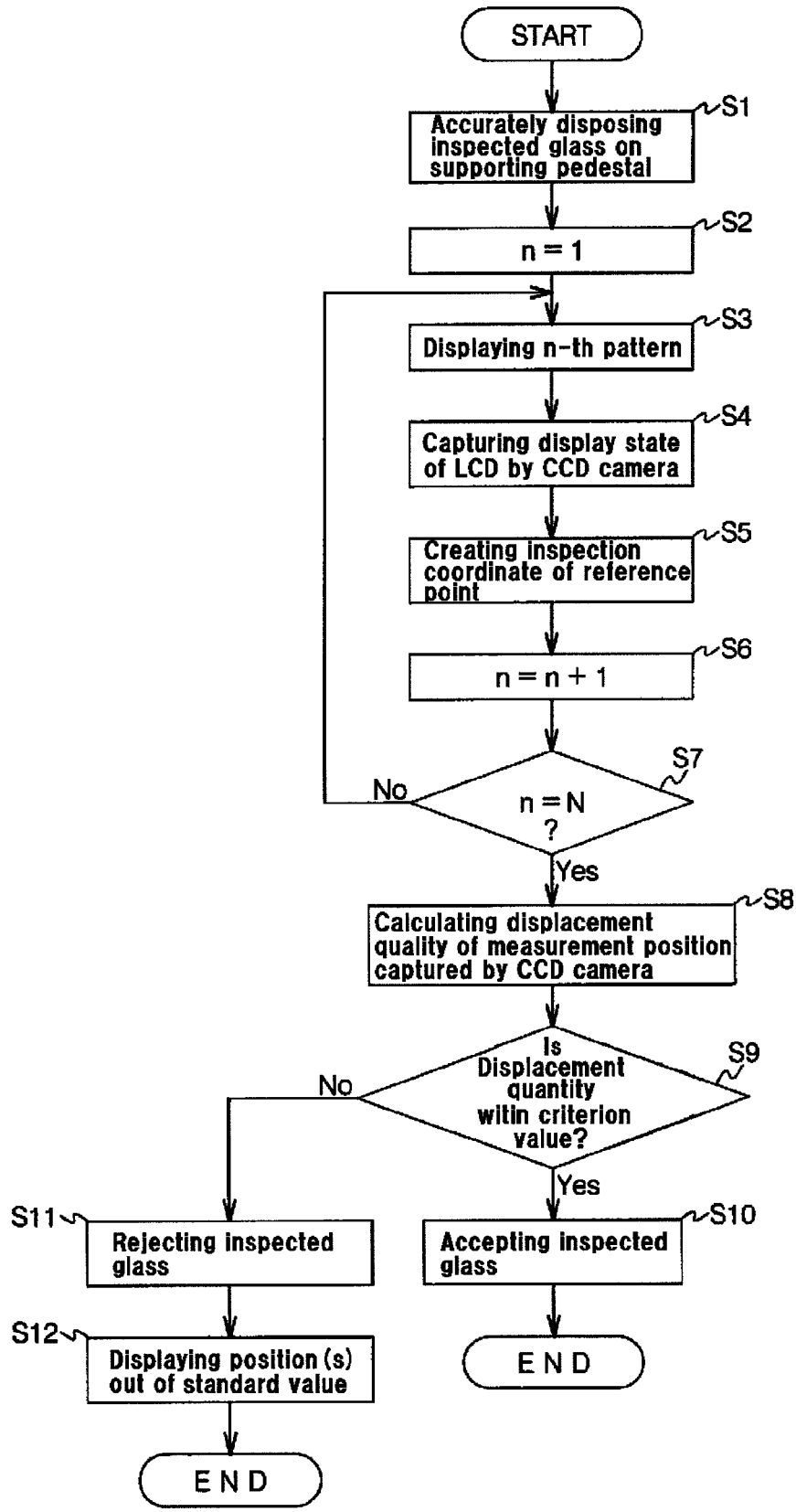
FIG. 8 is a flow chart for explaining an operation of the distortion inspecting apparatus according to one or more embodiments of the present invention.

FIG. 8 is a flow chart explaining the operation of the distortion inspecting apparatus according to one embodiment of this invention. In the flow chart, the reference coordinates of the reference points of the reference glass are previously captured, and the table of FIG. 5(*a*) is complete. First, the glass 4 to be inspected is accurately disposed on the supporting pedestal 3 (S1). Then, the first time with respect to the number of times of displaying is set to a counter (S2). Next, the pattern of the number of times that is set to the counter (for example, the first pattern of FIG. 7(*b*)) is retrieved from the table, and the pattern is, by being supplied to the LCD driver 8, projected by the projector 1 and displayed on the screen 2 (S3). The display state of the screen 2 is captured by the CCD camera 5 and then output to the image processing circuit 6. The image processing circuit 6 processes the image into a signal (digital signal) easily processed by the PC 7. The PC 7 stores a coordinate (U', V') from the image (S4). Here, since a coordinate (X, Y) is recognized when the pattern is retrieved, the inspection coordinate of the reference point (FIG. 5(*b*)) at this time is generated (S5). The counter is incremented (S6) and the retrieval of the next pattern is prepared. Whether or not n is the final time N is checked (S7) and, when n is not N, the flow returns to step S3. Steps S3 to S5 are repeated, and the coordinates are generated. When n=N in step S7, the inspection coordinate captured by the CCD camera 5 is calculated from the formula (1) based on the reference coordinate so that the displacement quantity is calculated (S8). Then, whether or not the displacement quantity is within a criterion value is checked (S9), and the inspected glass 4 is accepted (S10) with its displacement quantity being within the criterion value (YES in S9). On the other hand, the inspected glass 4 is rejected (S11) with its displacement quantity is out of the criterion value (NO in S9), and the position(s) of the glass that is out of a standard value is displayed (S12).

Figure 9:
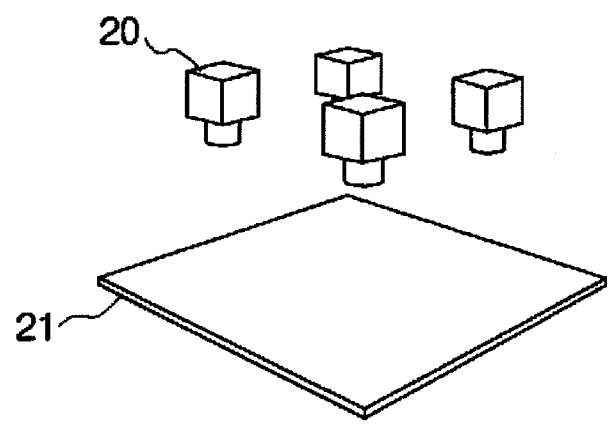
FIG. 9 is a perspective view showing an embodiment of an inspecting method according to a reference document.
Figure 10:
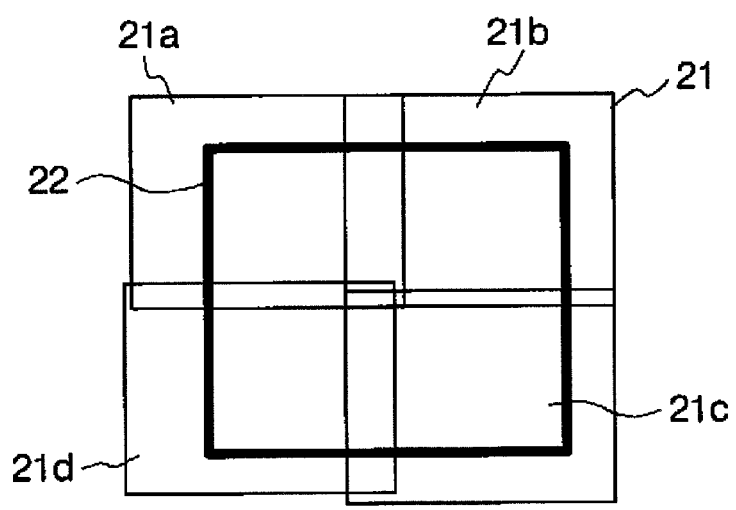
FIG. 10 is a diagram showing an inspection range according to the reference document.

Although a glass or mirror has been described as an object to be inspected for the perspective distortion in the above descriptions, it has also been expected, along with increase in size and resolution of a liquid crystal panel, to improve the efficiency of the inspection technique for it. In the inspection of a liquid crystal panel, image inspection using a CCD camera has been performed; see "ViEW2005 (Vision Engineering Workshop), the Japan Society for Precision Engineering (Technical Committee for Industrial Application of Image Processing), Dec. 8 (Thu.) and 9 (Fri.), 2005 (http://www.tc-iaip.org./view2005/)". However, an inspection using a plurality of cameras 20 is done for an inspection of a large liquid crystal panel, as shown in FIG. 9. When the cameras 20 are arranged as shown in FIG. 9, inspection areas 22 are overlapped with each other between the adjacent cameras as shown in FIG. 10. There is a problem that defect is counted redundantly in the overlapped areas, and the calculation of the position coordinate of the defect is disturbed. Namely, in order to automatically determine the overlapped areas, the arrangement of the cameras 20 and the position of a liquid crystal panel 21 must be strictly calibrated, but it is very difficult in practice. Thus, according to the method proposed by embodiments of the present invention, numbers are assigned to all elements on the liquid crystal panel 21 by coding measured points to be displayed, and the number of each element can be determined from images captured by the respective cameras 20. According to embodiments of the present invention, the arrangement of the cameras 20 and the position of the liquid crystal panel 21 can be relatively easily and freely set, and thus it is suitable for practical use.

Although the disclosure has been described with respect to only a limited number of embodiments, those skilled in the art, having benefit of this disclosure, will appreciate that other embodiments can be devised which do not depart from the scope of the present disclosure. Accordingly, the scope of the present disclosure should be limited only by the attached claims.

The invention claimed is:

1. A distortion inspecting apparatus, which inspects perspective distortion of a transparent object, comprising:
    a projector that projects a plurality of display points arranged at predetermined intervals;
    a screen that displays an image projected by the projector thereon and allows the image to pass therethrough;
    a pedestal that disposes the transparent object at a position where the image passed through the screen;
    a camera that captures the image that passed through the transparent object; and
    a control device that stores a reference position coordinate of the image that passed through a reference transparent object, compares the reference position coordinate with an inspection position coordinate of the image that passed through the transparent object as an object to be inspected, and calculates a displacement quantity of the reference position coordinate.

2. A distortion inspecting apparatus, which inspects perspective distortion of a transparent object, comprising:
    a projector that projects a plurality of display points arranged at predetermined intervals;
    a pedestal that disposes the transparent object at a position where an image projected by the projector passes through;
    a screen that displays the image that passed through the transparent object;
    a camera that captures the image displayed on the screen; and
    a control device that stores a reference position coordinate of the image that passed through a reference transparent object, compares the reference position coordinate with an inspection position coordinate of the image that passed through the transparent object as an object to be inspected, and calculates a displacement quantity of the reference position coordinate.

3. A distortion inspecting apparatus, which inspects reflective distortion of a reflective object, comprising:
    a projector that projects a plurality of display points arranged at predetermined intervals;
    a pedestal that disposes the reflective object at a position where an image projected by the projector is reflected;
    a screen that displays the image reflected by the reflective object;
    a camera that captures the image displayed on the screen; and
    a control device that stores a reference position coordinate of the image reflected by a reference reflective object, compares the reference position coordinate with an inspection position coordinate of the image reflected by the reflective object as an object to be inspected, and calculates a displacement quantity of the reference position coordinate.

4. A distortion inspecting apparatus, which inspects reflective distortion of a reflective object, comprising:
    a screen that displays a plurality of display points arranged at predetermined intervals;
    a pedestal that disposes the reflective object at a position where an image displayed by the screen is reflected;
    a camera that captures the image reflected by the reflective object; and
    a control device that stores a reference position coordinate of the image reflected by a reference reflective object, compares the reference position coordinate with an inspection position coordinate of the image reflected by the reflective object as an object to be inspected, and calculates a displacement quantity of the reference position coordinate.

5. The distortion inspecting apparatus according to claim 1, wherein, when distortion inspection is performed so that the transparent object or the reflective object is disposed on the pedestal, the control device sequentially displays the display points to capture the display points with the camera, and calculates the displacement quantity of the reference position coordinate based on a positional relationship between the reference position coordinate and the inspection position coordinate.

6. The distortion inspecting apparatus according to claim 1, wherein, when distortion inspection is performed so that the transparent object or the reflective object is disposed on the pedestal, the control device displays the display points in a coded manner to capture the display points with the camera, and calculates the displacement quantity of the reference position coordinate based on a positional relationship between the reference position coordinate and the inspection position coordinate.

7. The distortion inspecting apparatus according to claim 1, wherein, when distortion inspection is performed so that the transparent object or the reflective object is disposed on the pedestal, the control device displays all the display points at once to capture the display points with the camera, and calculates the displacement quantity of the reference position coordinate based on a positional relationship between the reference position coordinate and the inspection position coordinate.

8. The distortion inspecting apparatus according to claim 1, wherein the projector includes a liquid crystal panel having the plurality of display points, a light source for emitting light from a back side of the liquid crystal panel, and an optical system having a lens.

9. The distortion inspecting apparatus according to claim 4, wherein the screen is constituted of a liquid crystal panel having back side light emitting diodes.

10. The distortion inspecting apparatus according to claim 4, wherein the screen is constituted of light emitting diodes arranged at the predetermined intervals.

11. A distortion inspecting method of inspecting perspective distortion of a transparent object, comprising:
    projecting a plurality of display points arranged at predetermined intervals;
    displaying an image projected by the plurality of display points and allowing the image to pass therethrough;
    disposing the transparent object at a position where the image has passed through;
    capturing the image that passed through the transparent object; and
    storing a reference position coordinate of the image that passed through a reference transparent object, comparing the reference position coordinate with an inspection position coordinate of the image that passed through the transparent object as an object to be inspected, and calculating a displacement quantity of the reference position coordinate.

12. A distortion inspecting method of inspecting perspective distortion of a transparent object, comprising:

projecting a plurality of display points arranged at predetermined intervals;

disposing the transparent object at a position where an image projected by the plurality of display points passes through;

displaying the image that passed through the transparent object;

capturing the image displayed by the displaying; and storing a reference position coordinate of the image that passed through a reference transparent object, comparing the reference position coordinate with an inspection position coordinate of the image that passed through the transparent object as an object to be inspected, and calculating a displacement quantity of the reference position coordinate.

13. A distortion inspecting method of inspecting reflective distortion of a reflective object, comprising:

projecting a plurality of display points arranged at predetermined intervals;

disposing the reflective object at a position where an image projected by the plurality of display points is reflected;

displaying the image reflected by the reflective object;

capturing the image displayed by the displaying; and storing a reference position coordinate of the image reflected by a reference reflective object, comparing the reference position coordinate with an inspection position coordinate of the image reflected by the reflective object as an object to be inspected, and calculating a displacement quantity of the reference position coordinate.

14. A distortion inspecting method of inspecting reflective distortion of a reflective object, comprising:

displaying a plurality of display points arranged at predetermined intervals;

disposing the reflective object at a position where an image displayed by the displaying is reflected;

capturing the image reflected by the reflective object; and storing a reference position coordinate of the image reflected by a reference reflective object, comparing the reference position coordinate with an inspection position coordinate of the image reflected by the reflective object as an object to be inspected, and calculating a displacement quantity of the reference position coordinate.

15. The distortion inspecting method according to claim 11, further comprising:

sequentially displaying the display points to capture the display points; and calculating the displacement quantity of the reference position coordinate based on a positional relationship between the reference position coordinate and the inspection position coordinate, wherein the sequentially displaying and the calculating the displacement quantity are performed when distortion inspection is performed so that the transparent object or the reflective object is disposed by the disposing.

16. The distortion inspecting method according to claim 11, further comprising:

displaying the display points in a coded manner to capture the display points; and calculating the displacement quantity of the reference position coordinate based on a positional relationship between the reference position coordinate and the inspection position coordinate, wherein the displaying the display points and the calculating the displacement quantity are performed when distortion inspection is performed so that the transparent object or the reflective object is disposed by the disposing.

17. The distortion inspecting method according to claim 11, further comprising:

displaying all the display points at once to capture the display points by when distortion inspection is performed so that the transparent object or the reflective object is disposed by the disposing; and calculating the displacement quantity of the reference position coordinate based on a positional relationship between the reference position coordinate and the inspection position coordinate, wherein the displaying all the display points and the calculating the displacement quantity are performed when distortion inspection is performed so that the transparent object or the reflective object is disposed by the disposing.

18. The distortion inspecting apparatus according to claim 2, wherein, when distortion inspection is performed so that the transparent object or the reflective object is disposed on the pedestal, the control device sequentially displays the display points to capture the display points with the camera, and calculates the displacement quantity of the reference position coordinate based on a positional relationship between the reference position coordinate and the inspection position coordinate.

19. The distortion inspecting apparatus according to claim 3, wherein, when distortion inspection is performed so that the transparent object or the reflective object is disposed on the pedestal, the control device sequentially displays the display points to capture the display points with the camera, and calculates the displacement quantity of the reference position coordinate based on a positional relationship between the reference position coordinate and the inspection position coordinate.

20. The distortion inspecting apparatus according to claim 4, wherein, when distortion inspection is performed so that the transparent object or the reflective object is disposed on the pedestal, the control device sequentially displays the display points to capture the display points with the camera, and calculates the displacement quantity of the reference position coordinate based on a positional relationship between the reference position coordinate and the inspection position coordinate.

* * * * *